Figure 8:
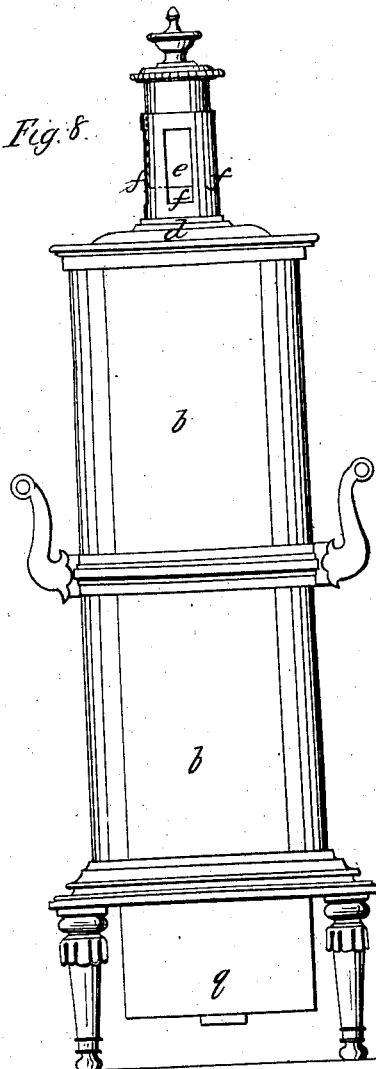

T. Joyce.
Magazine Stove.
N°1,005. Patented Nov. 12, 1838.
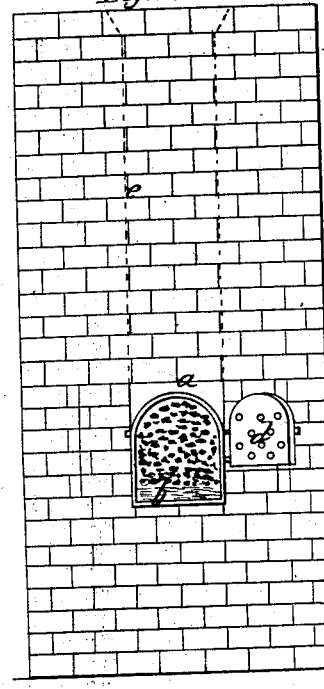
Fig. 1.
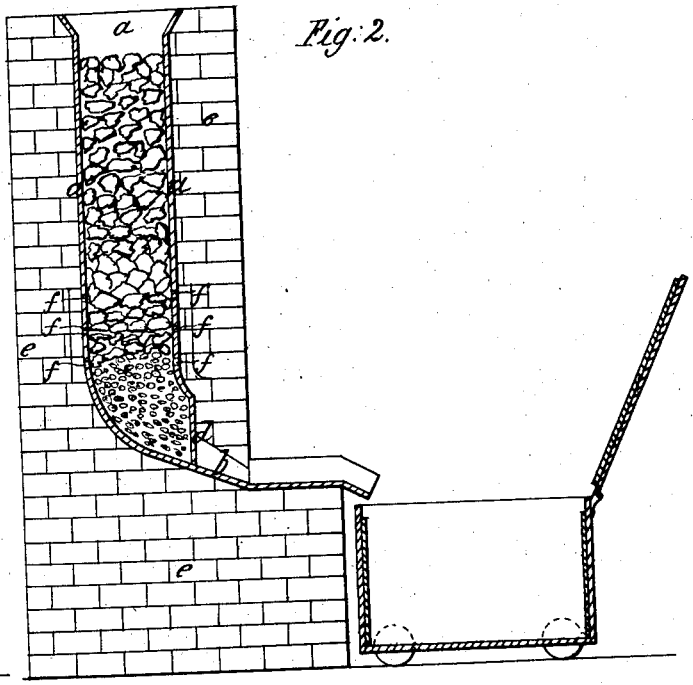
Fig. 2.
Fig. 10.
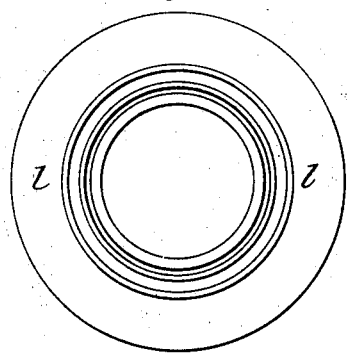
Fig. 11.
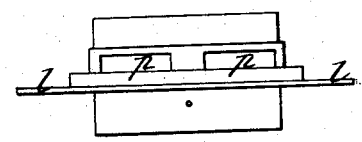
Fig. 12.
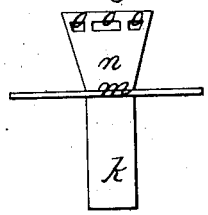
Fig. 13.
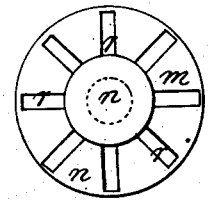
Witnesses;
Miles Berry
Wm Turn Mabley
Inventor;
Thos Joyce

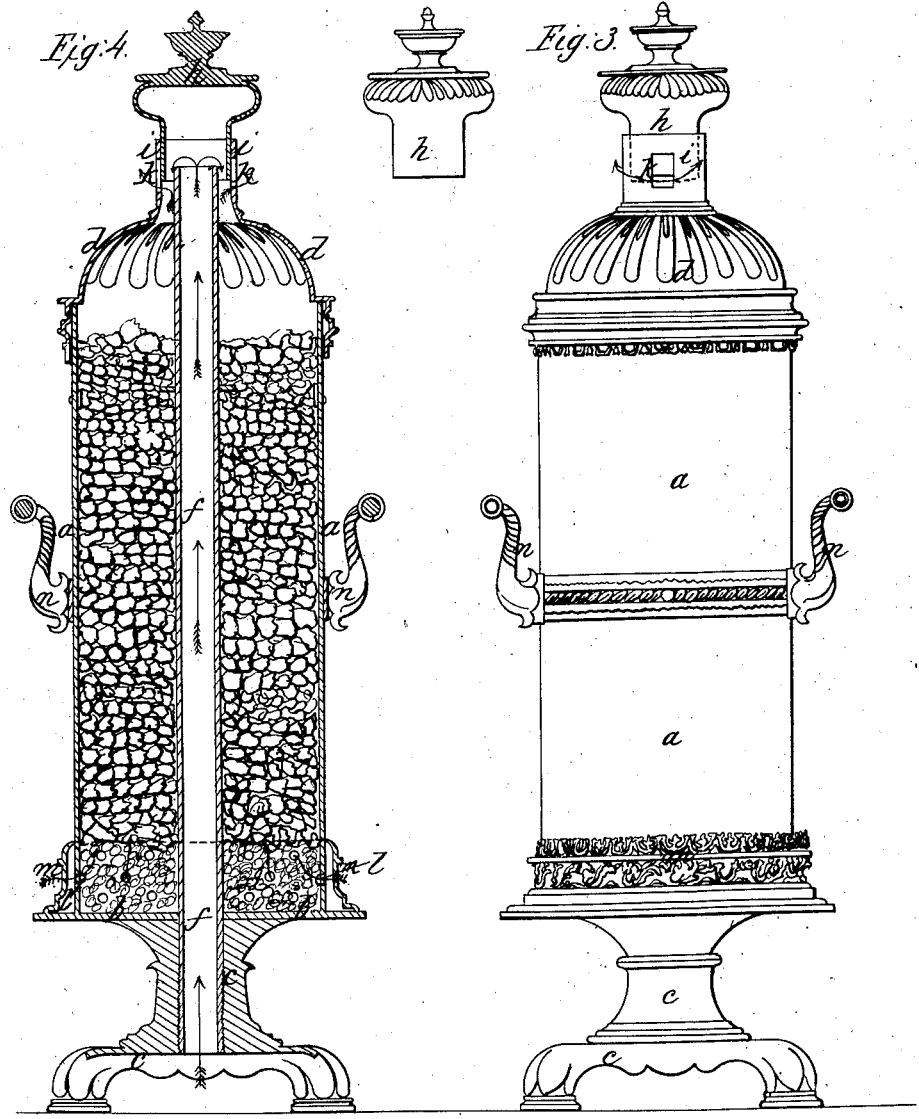

Sheet 3-4 Sheets.
T. Joyce.
Magazine Stove.
N° 1,005. Patented Nov. 12, 1838.
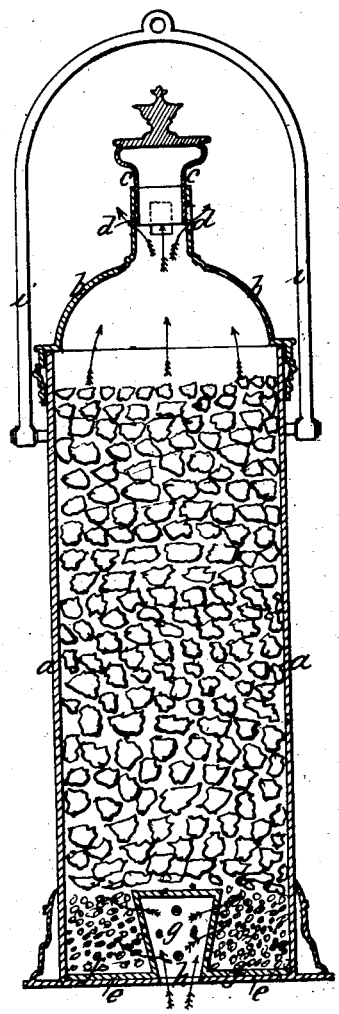
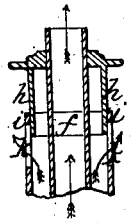
Fig. 6.
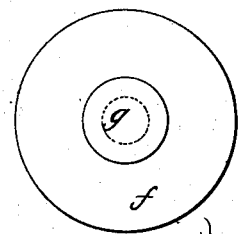
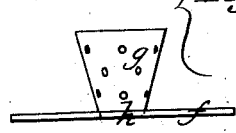
Fig. 7*
Witnesses;
Miles Berry
Wm Turn Mabley
Inventor;
Thos Joyce Sheet 4-4 Sheets.

T. Joyce.

Magazine Stove.

Nº 1,005. Patented Nov. 12, 1838.

Witnesses;
Miles L Berry
Wm Jason Mabley

Inventor;
Thos Joyce

UNITED STATES PATENT OFFICE.

THOMAS JOYCE, OF CAMBERWELL NEW ROAD, ENGLAND.

MODE OF PREPARING FUEL AND ALSO A STOVE TO BE USED THEREWITH FOR WARMING AND HEATING ROOMS AND OTHER APARTMENTS REQUIRING ARTIFICIAL HEAT.

Specification of Letters Patent No. 1,005, dated November 12, 1838.

*To all whom it may concern:*

Be it known that I, THOMAS JOYCE, a subject of the Queen of Great Britain, now residing in Camberwell New Road, in the county of Surrey and Kingdom of England, gardener, have invented or discovered a new and useful invention of improved or prepared fuel for warming and heating rooms, churches, factories, or other buildings, hot-houses, carriages, and other places or things requiring artificial heat and an improved stove or apparatus to be used with the same; and I do hereby declare that the following is a full and exact description thereof.

These improvements consist in the first place in preparing charcoal in such a manner as to render it fit and proper for burning or being consumed in rooms, factories, churches, carriages and other places requiring artificial heat without throwing off or giving out the deleterious vapors which arise from the combustion of charcoal not so prepared or in the state in which it is usually sold as an article of commerce. The charcoal so prepared may be consumed in stoves or apparatus without a chimney as all the deleterious vapors (carbonic acid gas, &c.,) which arise from the combustion of unprepared charcoal are either neutralized, abstracted or consumed in the course of such preparation and consumption and therefore the heated air and vapor arising from the combustion of the prepared charcoal may safely be allowed to escape into the atmosphere within the room or building without effecting the lungs or health of persons breathing the same. And secondary in improved arrangements and constructions of stoves or apparatus to be used with the so prepared charcoal for the better carrying the objects and intentions of my improvements into effect and I will proceed to describe the manner, method or process of so preparing the charcoal and then describe the improved constructions and arrangements of stoves or apparatus to be used with the same, referring to the drawings hereunto annexed which are representations of two kinds or constructions of such stoves or apparatus applicable to these purposes.

I first take the charcoal as it is usually charred or converted from different kinds of wood and sold by the charcoal burner. I break the same into lumps or pieces of from about one to two inches cube measure. I then immerse and saturate the same (or nearly so) in a solution of alkali containing as small a proportion of carbonic acid as I can procure it, say sub-carbonate of soda, which may be readily purchased in commerce, or caustic alkali and water, in the proportions of about three pounds of common soda (sub-carbonate) such as is usually sold in commerce dissolved in about twelve gallons of water; but I do not confine myself to these quantities as the proportions may vary according to the quality and nature of the soda or alkali. After the charcoal is so saturated or partly prepared it is allowed to drain and dry in a partial degree when it may be used as fuel in one of the kinds or constructions of stoves or apparatus secondly hereinafter described or it may be taken to a purifying furnace where the charcoal is further purified and its preparation completed so as to render it fit for the other kind or construction of stove or apparatus first hereinafter described, the difference in the construction of these two kinds of stoves or apparatus being, that in the one first described the heated air and vapor arising from the combustion of the completely prepared charcoal may be allowed to escape at once into the atmosphere through the body of unconsumed fuel, whereas in the second described stove or apparatus the impure vapor arising from the combustion of the partly prepared charcoal is obliged to descend through the fire and burning fuel before it can escape to the atmosphere. And as I prefer completing the process of preparing or purifying the charcoal pervious to burning it in a room, carriage or other situation where persons are breathing the air within, I shall proceed to describe the further process of preparing or purifying the said fuel and the kind of furnace I use for effecting the same.

After the charcoal has been saturated and allowed to drain as above stated it is to be taken to a purifying furnace such as that shown at Figure 1 which is a front elevation of one construction which I have found to answer the purpose, Fig. 2 being a vertical section taken through the same.

*a, a,* is the tower or chimney of the furnace into which the partly prepared or saturated charcoal is introduced at the top part, this chimney may be constructed of iron or other suitable material and is formed with the inclined plane or mouth piece b at its lower end to facilitate the removal of the fuel.

d is the opening or aperture by which the fuel is removed when required and is furnished with a door pierced with holes if necessary.

The tower or chimney may be set in brickwork e, e, as shown in the drawing or supported in any convenient manner.

f f are apertures formed through the brick work and the tower for the admission of air to support the combustion or ignition of the fuel under process of operation.

When a sufficient quantity of the partly prepared or saturated charcoal is placed in the furnace it is to be ignited at the lower part, the draft causing it to burn. The charcoal is allowed to continue in a state of ignition or combustion until it becomes thoroughly red hot and as soon as it is so it may be removed through the aperture d, other charcoal continually falling down as that which is red hot is withdrawn which immediately it is taken out of the furnace is put into a tank of vessel composed of iron or brickwork and closed tight by means of a lid or cover so as to exclude the air when the combustion of the prepared charcoal will be immediately stopped and extinguished in a short space to time. The now completely prepared charcoal may then be removed from the tank and allowed to cool, it being in a purified state fit to be used in any open stove or apparatus or such as is hereinafter first described. The process of purifying may be continuous, fresh partly prepared or saturated charcoal being added to the furnace and removed as it becomes red hot and immediately extinguished and cooled as above stated.

Having now described my method or process of preparing and purifying charcoal I would remark that other alkali than that I have mentioned (sub-carbonate of soda, &c.,) or rather alkali in a different state, may be used in the above preparing and purifying process and also that some of the alkaline earths may be used for the same purpose although not with such good effect. And further some or one of them may be employed in conjunction with soda or other caustic alkali. For instance, a solution of lime and water may be employed; but if lime is used it should be newly made as it absorbs carbonic acid from exposure to the atmosphere and would therefore be unfit for this purpose and it will of course be understood by all practical chemists that soda or other alkalis possessing a too great proportion of carbonic acid will be improper for this purpose. I therefore do not intend to confine myself to the use of sub-carbonate of soda, my invention being the preparing and purifying charcoal by means of alkali in solution and the application of heat as hereinbefore described and I have only stated in the foregoing description that which I have found to answer the purpose well and I will now proceed to describe the improved arrangements and constructions of stoves I have found to answer best in using the said prepared charcoal and for regulating or increasing or diminishing the intensity of heat given out by the stove and consequently the combustion of the fuel.

Fig. 3 is a side elevation of one arrangement and construction of a small stove or apparatus for burning the said completely prepared charcoal in which the heated air or vapor arising from the combustion of the fuel is allowed to escape at once to the atmosphere and is drawn to a scale of about one third the real size and is calculated for use in a dwelling room, counting house, or office and will contain sufficient fuel for about 24 hours consumption keeping the atmosphere in the room or office in a moderate degree of temperature but the dimensions may be increased in proper proportion more in height than diameter. Fig. 4 is a vertical section of the same. a a is the casing of the stove supported upon the bottom plate b and the pillar and claw stand c. The top or cover d fits over the edges of the case and is to be removed by lifting it off when the fuel is to be introduced into the stove. f is a hot air pipe passing through the center of the stove the lower end being open to the atmosphere, the upper end projecting into the top part of the cover; this pipe is kept in its proper situation by means of the guide or stretcher g. At the top of the cover a contrivance is placed for regulating the draft through the stove and consequently the heat given out and also the combustion of fuel. It consists of a sliding hollow stopper or damper h shown attached at Fig. 5. Fitting inside of the top part i of the cover k k are apertures formed in the part i and by raising or lowering the damper h. These apertures will be opened or closed. l l are holes formed in the bottom part of the stove for the admission of air to support the combustion within, the open worked ornamental border m being placed so as not to prevent the admission of air through them. At the same time it prevents any sparks or dust falling from the stove. The direction of the draft through the stove is shown by the arrows. n n are handles for the convenience of moving the stove from one place to another.

In order to ignite the prepared fuel in the stove I prefer when it is convenient first making a small quantity of it red hot in a shovel or ladle placed in a common kitchen or open coal fire and then placing it at the bottom of the stove and the rest of the required quantity of fuel above it which will immediately ignite. But this improved fuel may be ignited in any other way as common charcoal, coke or other fuel may be ignited but when this is the case it should be done out of doors or in another room than that in which the stove is intended to be placed as there will be some disagreeable vapors arising from the materials used to ignite the prepared charcoal although there will be none from the fuel itself.

Fig. 6 is a detached sectional figure of another arrangement of the damper and central hot air pipe which in this instance protrudes through the damper and will be readily understood by inspecting the drawings, the same letters of reference being marked upon corresponding parts as in the former figures.

It will be seen that the greater proportion of heat given out by this stove is by radiation no more air being allowed to pass through the stove than is required to support the combustion in the required degree.

Fig. 7 is another sectional figure of a small stove or apparatus of the same kind or construction but without the central hot air pipe and is intended to be used in a carriage or in cabins of vessels or such other situations and may be suspended from the ceiling or roof. $a$ is the casing, $b$ the top on cover, $c$ the damper, $d$ the apertures for the exit of the hot air and vapor arising from the combustion of the fuel.

$e\ e$ is the bottom plate.

$f$ is another or inner bottom plate with a hollow cap $g$ formed upon it shown detached in top and side views at Fig. 7. The air to support combustion is allowed to enter the stove by the aperture $h$ formed through the bottom plates and thence through holes formed in the hollow cap $g$ to the interior. This stove or apparatus may be suspended by means of the handle $i$ or by chains in any convenient manner.

I shall now proceed to describe the second arrangement and construction of stoves or apparatus intended to be used with the partly prepared or saturated charcoal as before mentioned in which the vapor and heated air is caused to pass downward through the fire or burning fuel. The fuel in this arrangement or construction of stove is placed in a chamber closed at the top and is ignited at the bottom part as before.

Figure 9:
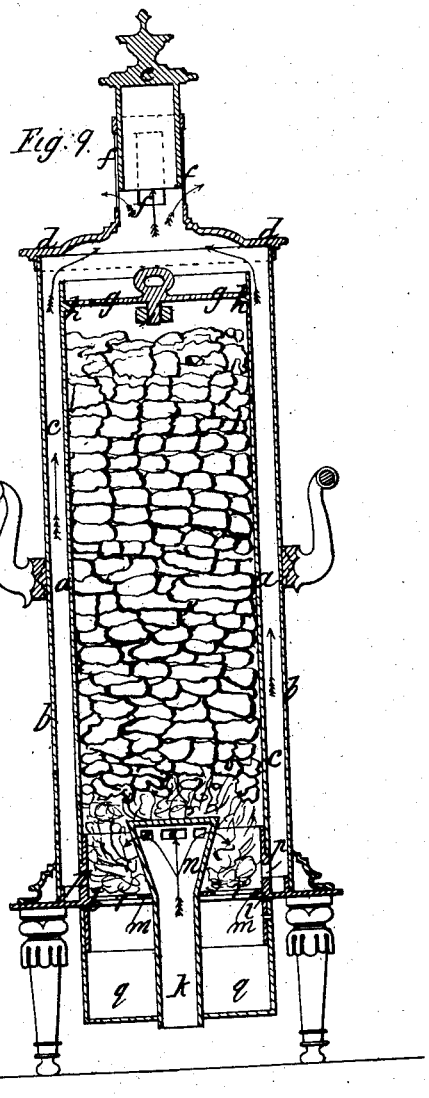

Fig. 8 is a side elevation of the stove or apparatus, Fig. 9 is a vertical section of the same and Fig. 10 is a horizontal view and Fig. 11 a detached side representation of the outer bottom plate with the parts attached thereto showing the exit aperture for the heated air. Fig. 12 is a detached side representation of the cold air pipe and its cap furnished with holes for the admission of the air to the burning fuel. Fig. 13 is a plan view of the same.

$a, a$ is the inner casing of the stove forming the chamber for the fuel; $b\ b$ is the outer casing. Between these two cases a passage or channel $c, c$ is formed for the passage of the heated air passing from the interior of the stove to the exit aperture.

$d$ is the top or cover furnished with the damper, $e$, and exit apertures $f$.

$g$ is the lid lid or cover of the fuel chamber which is to be secured tight upon its seat $h$ after the proper charge of fuel is put in by means of a screw at $i$ or any other convenient fastening. The air to support the combustion of the fuel is admitted by the pipe $k$ which may be attached to the bottom plate $l$ supported by feet as in the former instance or it may be constructed with a second bottom plate $m$ as shown in the drawing. This pipe with its cap and bottom plate is shown detached in plan and side views at Figs. 12 and 13.

$n$ is the cap of the pipe $k$ through which the air enters to the interior and burning fuel by means of the apertures $o, o$.

$p, p$ are the apertures for the escape of the heated air arising from the combustion into the passage or chamber $c$. The cup or ash pit $q$ receives the ashes falling from the combustion through the holes or grating formed at $r\ r$ in the bottom plate $m$ and is attached to the outer bottom plate by a bayonet fastening as shown in the drawing or in any convenient manner.

On a charge of fuel being put into this stove the cover $d$ is first to be removed by lifting it off, then the cover $g$ is to be taken out of the inner case $c$ and a small quantity of ignited fuel placed in the bottom part when the full charge of damp saturated or partly prepared fuel may be placed in the stove and the top or cover $g$ secured in its place. As the fuel burns the heat will cause the damp fuel to give out steam or vapor which not being able to escape at the top part of the case $c$ to the atmosphere will be confined within the chamber until it acquires a sufficient degree of elasticity to force its way through the fire or burning fuel, and will therefore become purified, all the deleterious vapors or its impurities being thereby arrested or consumed and the hot air or vapor will escape through the apertures $p$ up the chamber $c$ to the atmosphere.

Having now described my second improved construction and arrangement of stove or apparatus I would remark that variations may be made in the forms and arrangements of the parts of these my improved arrangements and constructions of stoves or apparatus without essentially departing from the principles of their construction, for instance, a different kind of damper may be applied thereto and also the arrangement of the apertures for the admission and passage of the air to support combustion may be placed differently. And further in some instances the outer casing $b$ of the second construction of stove may be dispensed with; all of which variations will readily suggest themselves to any practical engineer or mechanic. And in conclusion I would remark that if a damp or humid atmosphere should be required it is only necessary to place a small vessel containing water in the top part or cover of the stove. The water will give out steam in proportion to the intensity of the heat and produce the desired effect.

I claim as my invention—

The manner of preparing the fuel by means of alkalis, as herein set forth; and also the construction of the stoves for burning the same, whether of the first or second kind described, together with such variations thereof as are substantially the same in their operation and results.

And further it will be evident that this prepared or purified fuel is equally applicable to the purposes for which common or unprepared charcoal is used as in copper plate printers', bookbinders' and such other open stoves and a variety of other purposes, for plate warmers, tea or coffee urns, or for boiling water in vessels, a small stove being placed or constructed in the interior of such urns or vessels; also that the same kind of contrivance may be adapted to cylinders or rollers used in paper making machinery, calico printing, drying apparatus, woolen manufactures and other such purposes where red hot iron heaters or steam is now usually employed, to all of which purposes the same may be applied proper arrangements in the details of the mechanism being made accordingly.

In witness whereof I the said THOMAS JOYCE, have hereunto set my hand and seal this twelfth day of January in the year of our Lord 1838.

THOS. JOYCE. [L. S.]

Witnesses:
MILES BERRY,
WILLM. HARPER.